Figure 1:
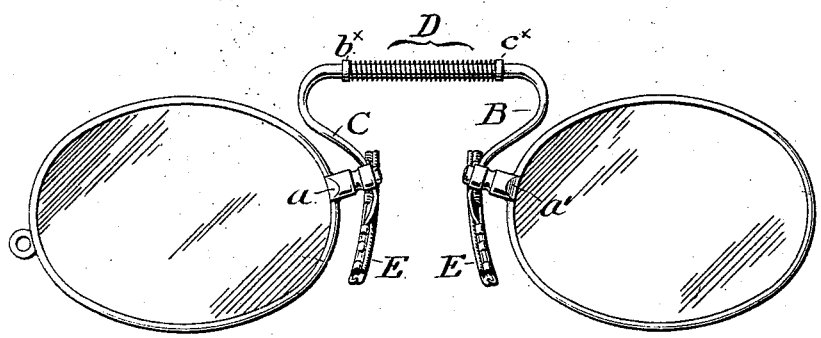

(No Model.) 2 Sheets—Sheet 1.

H. E. KIRSTEIN.
EYEGLASSES.

No. 527,611. Patented Oct. 16, 1894.

Henry E. Kirstein
INVENTOR:
By his attorneys
Strawbridge & Taylor

WITNESSES:
N. E. Paige
R. M. Russell (No Model.) 2 Sheets—Sheet 2.
H. E. KIRSTEIN.
EYEGLASSES.
No. 527,611. Patented Oct. 16, 1894.
FIG. 5.
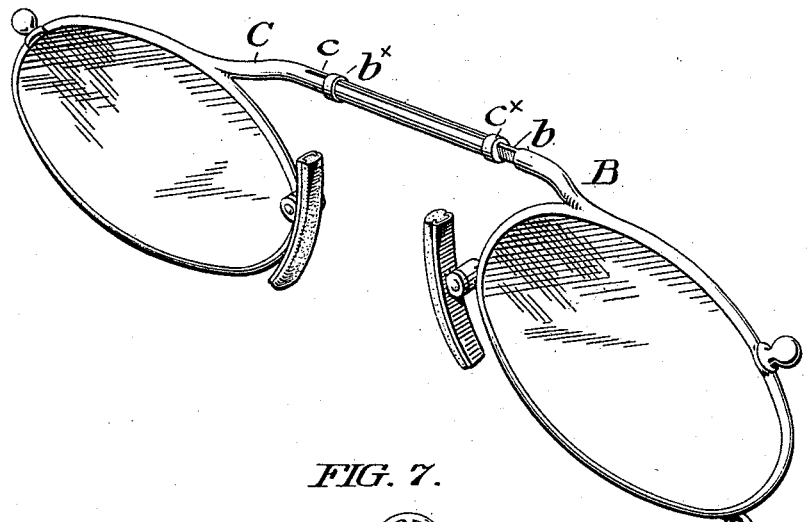
FIG. 7.
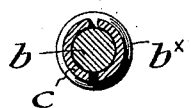
FIG. 6.
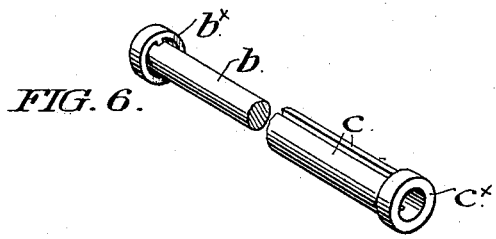
FIG. 8. FIG. 9.
 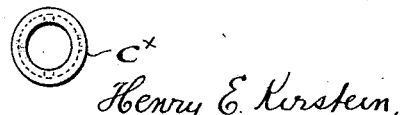
Henry E. Kirstein,
INVENTOR:
By his attorneys
Strawbridge & Taylor
WITNESSES:
N. E. Paige
R. M. Russell

UNITED STATES PATENT OFFICE.

HENRY E. KIRSTEIN, OF ROCHESTER, NEW YORK.

EYEGLASSES.

SPECIFICATION forming part of Letters Patent No. 527,611, dated October 16, 1894.

Application filed December 24, 1892. Serial No. 456,206. (No model.)

*To all whom it may concern:*

Be it known that I, HENRY E. KIRSTEIN, a citizen of the United States, residing at Rochester, in the county of Monroe, in the State of New York, have invented certain new and useful Improvements in Eyeglasses, of which the following is a specification.

In Letters Patent of the United States No. 465,821, dated December 22, 1891, is disclosed an eye glass of the class in which the connecting bow is made adjustable to allow of movement of the lenses toward and from each other and in which a spring, mounted upon or in connection with the bow, constantly operates to force the lenses toward each other, so that, in use, the lenses or their nose pieces are held against the opposite sides of the nose of the wearer with a pressure commensurate with the strength of the spring.

In the form in which the invention of the Patent No. 465,821 is therein illustrated as embodied, independent bow or bridge side bars are secured to and extend upwardly from the clamp posts of the respective lenses, and terminate at their free upper extremities in heads or lateral enlargements. To the head of one bridge side-bar is affixed a pair of horizontally disposed slide pins, provided at their free extremities with a yoke,—and to the head of the other bridge side bar is affixed a single horizontally disposed slide pin extending through the said yoke and intermediate of said two slide pins, and provided at its free extremity with a yoke which embraces the said two slide pins. A spiral spring is interposed between and bears against the respective yokes to draw the lenses toward each other.

While the mechanical construction thus outlined is found in practice to constitute a useful and practical connecting bridge, its desirability is impaired by several disadvantageous conditions. Thus, for instance, the three pins are each of circular cross-section, so that when assembled they involve a considerable waste of space and constitute a bulk undesirable and objectional in articles of this character; then also, the presence of the projecting edges and corners of the heads of the side bars at and about the junction of the side bars with the bases of the pins is objectionable because said edges add to the unsightliness of the construction and are liable in use to become caught in articles of clothing and occasion breakage of the lenses.

It is the object of my invention to provide an eye glass or spectacle bridge of the class set forth in said patent which shall embody all of its smoothness and certainty of operation, but to so arrange it as to avoid the objections hereinbefore mentioned.

In the drawings I show and herein I describe a preferred form of a convenient embodiment of my invention, the particular subject-matter claimed as novel being hereinafter definitely specified.

Figure 2:
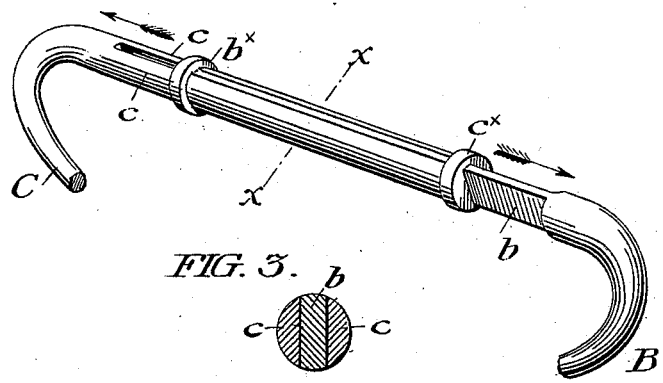
Figure 3:
Figure 4:
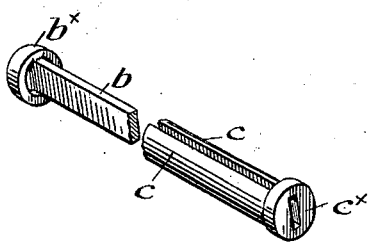

In the drawings, Figure 1 is a view in front elevation of a pair of eye glasses embodying my invention. Fig. 2 is a view in perspective of my improved form of bridge, from which view the spiral spring is omitted for clearness of illustration. Fig. 3 is a transverse section of the bridge on the line $x$—$x$ of Fig. 2. Fig. 4 is a fragmentary view in perspective of the slide pins and yokes. Fig. 5 is a view in perspective of a pair of eye glasses illustrating an arrangement in which the bridge side bars join the lens rims at the upper edges of the latter. Fig. 6 is a fragmentary view, in perspective, of a modified arrangement of slide pins. Fig. 7 is a view in transverse section of the slide pins shown in Fig. 6. Figs. 8 and 9 are views in end elevation of the yokes employed in the arrangement of slide pins illustrated in Fig. 6.

Generally stated, one part of my invention comprehends the provision of an eye glass or spectacle, the bridge or connection between the lenses of which is constituted by a pair of bridge side bars extending upward from the respective clamp posts, or from any preferred portion of the rims of the lenses, and by slide pins preferably formed integral with and as continuations of said side bars, and preferably also provided with matching side faces so as to lie snugly together and occupy a minimum space, and which slide pins constitute respectively, in cross-section, segmental, or other, subdivisions of a small cylindric or other bar which they collectively complete.

Referring to the first four figures of the drawings, and the particular construction therein illustrated, $a$ $a'$ are the clamp posts of a pair of lenses, and B C are the bridge side bars, the lower extremities of which side bars are in said figures shown as affixed to the respective clamp posts. The side bar B extends upwardly and outwardly over the adjacent lens to a point above the latter, then turns upon itself and extends horizontally toward the other lens, to form a slide pin $b$. The side bar C extends upwardly and outwardly over its adjacent lens to a point above the latter, then turns upon itself and extends horizontally toward the other lens to form two parallel slide pins $c$.

The side bars B C are conveniently, although not restrictively, formed of round wires which, while preferably quite thin at their lower portions, may at their upper portions be of increased diameter so as to be at their bends of a diameter about qual to the aggregate diameters of the slide pins. The slide pin $b$ on the one hand and the slide pins $c$ on the other, are of such cross-section as to be adapted to nest snugly and closely together to complete the cylindric or other preferred symmetrical bar which they collectively constitute.

In the first four figures of the drawings I illustrate the two pins $c$ as being each of segmental cross-section, with flat interior faces opposing each other, and the pin $b$ as of segmental cross-section having flat exterior sides and being of such dimensions as to fit snugly between the pins $c$ and complete the cylindric bar of which the pins $c$ constitute oppositely disposed outside portions. As a matter of fact, the pins $c$ are most conveniently formed by cutting a longitudinal slot of the appropriate dimensions through the center of the horizontal portion of the side bar C from its free end in to a point near its curve,—while the pin $b$ is conveniently formed by cutting away the opposite sides of the horizontal portion of the round bar which constitutes the side bar B from its free end to a point in the vicinity of its bend.

The free extremity of the pin $b$ is equipped with a yoke $b^x$, which embodies two segmental openings through which the pins $c$ extend, and, in the operation of the glasses, slide.

The free extremities of the pins $c$ are provided with a yoke $c^x$ embodying an opening through which the pin $b$ extends, and, in the operation of the glasses, slides. These yokes $b^x$ $c^x$ are preferably of circular form so as to match the configuration of the assembled pins.

D is a spiral spring surrounding the three pins referred to, and the respective extremities of which bear against the yokes $b^x$ $c^x$. As will be understood, the expanding thrust of this spring, tending as it does to force the yokes $b^x$ $c^x$ away from each other, will of course operate to draw the lenses together, a movement which is only limited by the length of the slide pins or the contact of the nose pieces with the nose of the wearer.

E E are nose pieces of any desired character, shown in the drawings as mounted upon the clamp posts.

As will be understood, the formation of the pins as integral continuations of the respective side bars obviates the necessity for joints or projecting corners; and the formation of the several pins as segmental or other sub-divisions of a single cylindric or other, symmetrical bar reduces the dimensions of said pins to a minimum and obviates the excessive size of the completed structure resultant from a construction in which each pin is itself a cylindric or other bar independent of and not matching with the other bars.

The bridge side bars referred to in this specification are the devices which constitute the connection between the slide pins on the one hand and the lenses on the other, and they may be made in any preferred form and disposed in any preferred arrangement, vertical, horizontal, or otherwise.

In Fig. 5 of the drawings I illustrate an embodiment of my invention in which the bridge side bars are arranged in a practically horizontal disposition, being connected to the respective lens rims at points at the upper edges and preferably midway of the lengths of the latter.

In Figs. 6, 7, 8 and 9, I illustrate an arrangement of slide pins in which the pin $b$ is of cylindric section, and in which the interior faces of the pins $c$ are of concave form to snugly fit against the opposite sides of the pin $b$, while the exterior circumference of the pins $c$ of course exceeds that of the pin $b$.

I claim—

1. As an article of manufacture, a pair of spectacles or eye glasses equipped with a pair of bridge side bars, one slide pin projecting horizontally from one of said side bars, two slide pins projecting horizontally from the other of said side bars, said slide pins having matched side faces, yokes by which said slide pins are mounted in sliding engagement with each other, and a spring adapted to draw the lenses together, substantially as set forth.

2. As an article of manufacture, a pair of eye glasses or spectacles, bridge side bars, one slide pin projecting from one side bar, two slide pins projecting from the other side bar, said slide pins being of such cross-section as to fit snugly together to form a cylindric or other bar, yokes mounted upon said slide pins, and a spring, substantially as set forth.

3. As an article of manufacture, a pair of eye glasses or spectacles provided with bridge side bars, a slide pin formed as an integral continuation of one side bar, two slide pins formed as integral continuations of the other of said side bars, said slide pins being of such cross-section as to fit snugly together laterally, yokes by which said slide pins are mounted free for sliding engagement with each other, and a spring tending to draw the lenses together, substantially as set forth.

4. As an article of manufacture, a pair of spectacles or eye glasses, bridge side bars extending upwardly from the clamp posts or other convenient portion of the glasses, one of said bridge side bars having a horizontal extension, of circular outline in cross-section, embodying, to form it into two slide pins, a central longitudinal slot, the other of said bridge side bars having a horizontal extension shaped to fit snugly within the said slot, yokes mounted upon the extremities of the respective pins, and a spiral spring surrounding said pins and bearing against their respective yokes, substantially as set forth.

5. As an article of manufacture, a pair of spectacles or eye glasses, bridge side bars extending upwardly from the clamp posts or other convenient portion of the glasses, one of said bridge side bars having an integral horizontal extension of circular outline in cross-section, embodying, to form it into two slide pins, a central longitudinal slot, the other of said bridge side bars having an integral extension shaped to snugly fit within the said slot, yokes mounted upon the extremities of the respective pins, and a spiral spring surrounding said pins, and bearing against their respective yokes, substantially as set forth.

In testimony that I claim the foregoing as my invention I have hereunto signed my name this 7th day of October, A. D. 1892.

H. E. KIRSTEIN.

In presence of—
F. NORMAN DIXON,
R. M. RUSSELL.